(12) United States Patent
Diaz et al.

(10) Patent No.: US 6,366,455 B1
(45) Date of Patent: Apr. 2, 2002

(54) COMPUTER WITH TRANSLATING DOOR

(75) Inventors: Elizabeth B. Diaz, Woodside; Peter K. Lee, San Jose, both of CA (US); Kun-Chi Hsieh, Taipei (TW)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/583,453

(22) Filed: May 30, 2000

(51) Int. Cl.$^7$ ................................................. H05K 7/00
(52) U.S. Cl. ...................... 361/683; 361/759; 248/216; 292/307 R
(58) Field of Search ................................ 361/683–686, 361/724–727, 740, 759; 248/216, 218; 292/42, 148, 151, 307 R; 70/57–58, 85

(56) References Cited

U.S. PATENT DOCUMENTS 5,882,053 A * 3/1999 Bekins et al. ............ 292/336.2
6,126,211 A * 10/2000 Dominquez ................ 292/174

* cited by examiner

Primary Examiner—Leo P. Picard
Assistant Examiner—Hung Van Duong (57) ABSTRACT

A computer comprising of at least one electrical connection port, an exterior casing overlying the port and having a casing opening in axial alignment with the port, a door member displaceable mounted on the computer, the door member having a plurality of translationally displaced operating positions comprising a first operating position with the door member positioned in the opening with an exterior surface thereof flush with a circumscribing surface of the exterior casing; a second operating position with the door member axially aligned with and inwardly displaced from the opening and a third operating position with the door member axially offset from the opening.

9 Claims, 12 Drawing Sheets

COMPUTER WITH TRANSLATING DOOR

FIELD OF THE INVENTION

The present invention relates generally to computers and, more particularly, to a door assembly covering an access opening to computer I/O ports and the like.

BACKGROUND OF THE INVENTION

As computers have become more and more powerful the number of peripheral devices which may be connected to computers has steadily grown. It is not uncommon for modern computers to have ten or more ports of various types such as USB connectors, fire wire connectors, serial connectors, parallel connectors, modem ports, network ports, microphone ports, audio in/out ports, video in/out ports, etc. (referred to herein generally as "I/O ports" or "electrical connector ports"). Whereas in the past most electrical connection ports were located at the back of the computer, today many computers have at least some electrical connector ports provided at a front portion thereof. Connector ports located at the back portion of the computer are typically not covered in any way since the computer user and most others in the environment of the computer will not be viewing the rear face of the computer. However, with electrical connector ports provided at a front portion of a computer it is generally desirable to provide some sort of connector port cover, as a matter of general aesthetics. One possibility for such a cover is a pivotal door which swings open to expose the electrical connector ports and closes to cover the ports when they are not in use. The problem with pivotal doors is that when pivoted outwardly they project outwardly from the front of the computer and are easily bumped and broken or dislodged. When they pivot inwardly they require a great deal of clearance space. Also, they are hard to get hold of to pull shut. Another possibility is a slide door mounted at either the front or back surface of the computer casing which may slide upwardly or to the slide to expose an opening in the computer casing through which the electrical connector ports are accessible. The problem with such a sliding door is that when mounted on the outside of the casing it produces an aesthetically unpleasing appearance and when mounted on the inside of the casing it exposes a recess in the casing, when it is in the closed position, which is also aesthetically unappealing and which is likely to collect dust, etc.

From applicants' observations, it would be generally desirable to provide a computer door assembly which is positionable in flush relationship with the exterior surface of the computer casing when closed and which is openable without having a portion thereof projecting outwardly from the computer or projecting inwardly a large distance.

SUMMARY OF THE INVENTION

The present invention is directed to a computer having a door assembly in its outer casing which may be translationally displaced to a position just behind the inner surface of the casing and then moved in a direction parallel to the surface of the casing to expose at least one electrical connector positioned below the door.

Thus, the invention may comprise a computer having at least one electrical connection port, an exterior casing overlying the port and having a panel opening in axial alignment with the port, a door member displaceable mounted on the computer member, the door member having a plurality of translationally displaced operating positions comprising a first operating position with the door positioned in the opening with an exterior surface thereof flush with a circumscribing surface of the exterior panel; a second operating position with the door axially aligned with and inwardly displaced from the opening and a third operating position with the door axially offset from the opening.

The invention may also comprise of a computer door assembly comprising of a door member having a front surface and a rear surface and a plurality of rearwardly extending door projections, a slider member having a front surface and a rear surface; a plurality of openings extending between the front and rear surfaces; a plurality of rearwardly extending slider projections; the plurality of rearwardly extending door projections extending through corresponding ones of the plurality of openings in the slider member; a coil spring mounted about one of the plurality of door projections and captured between the rear surface of the door member and the front surface of the slide member; a leaf spring having a first end attached to a first one of the rearwardly extending door projections and having a second end attached to one of the plurality of rearwardly extending slider projections and having an intermediate portion resiliently deflectablely engagable by a second one of the rearwardly extending door projections during rearward displacement of the door member relative the slider member; a guide member having a plurality of guide surfaces thereon adapted to guidingly engage at least one of the plurality of rearwardly extending slider projections; the door member being displaceable relative the slider member between a first axial position and a second axial position; the slider member being displaceable relative the guide member in a plane extending transversely of the axial direction.

The invention may also comprise of a method of opening a computer door comprising of (a) pushing the door axially against an abutment surface; and (b) sliding the door in a direction perpendicular to the axial displacement.

DETAILED DESCRIPTION OF THE INVENTION

Computer Housing and Casing

Figure 11:
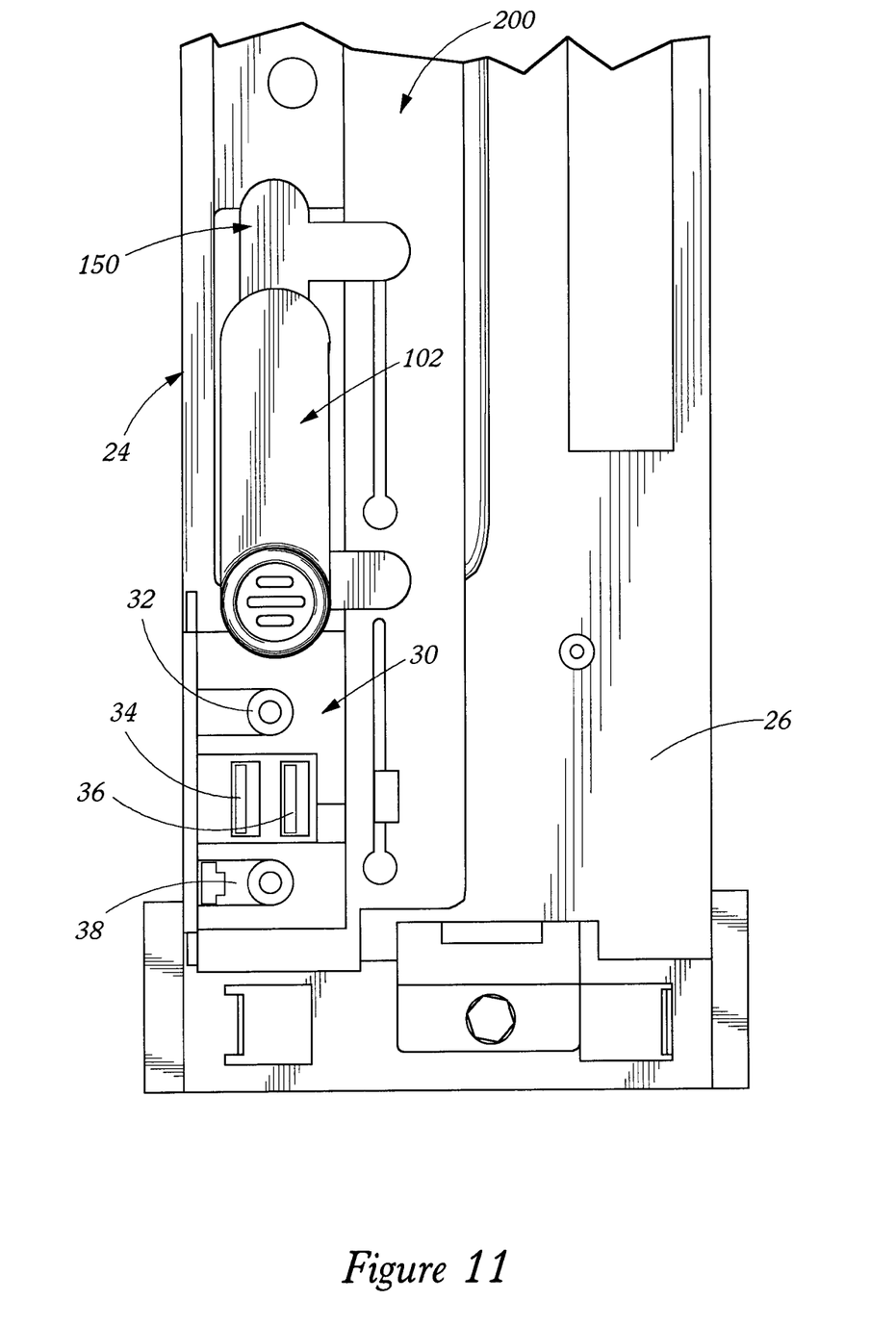
FIG. 11 is a front elevation view of a lower portion of a computer with the casing removed showing a computer door in a raised operating state similar to FIG. 4 with the door projecting further outwardly due to the absence of the casing.

FIGS. 1–4 illustrate a computer 10 having a top portion 12, a bottom portion 14, a front portion 16, a rear portion 18, a left side portion 20 and a right side portion 22. The computer has an interior sheet metal housing 24 having a front face portion 26 as best illustrated in FIG. 11. An electrical connector port assembly 30 is provided in an opening in the sheet metal housing front face portion 26. The electrical connection port assembly may also be provided at either of the side faces, the rear face, or the top face portion of the housing 24 as well as at the location illustrated in the drawing. The electrical connector port assembly 30 may comprise one or more electrical connectors of any type such as audio port 32, USB ports 34, 36 and microphone port 38 illustrated in FIG. 11.

An exterior casing 50, which in the illustrated embodiment includes integrated front and top member 52, a rear member 54, a base member 56 and a left and right side panel member 58, 60 is removable attached to the sheet metal housing 24 as by connector tabs, etc. The sheet metal housing 24 and exterior casing 50 in one preferred embodiment are the same as illustrated in U.S. patent application Ser. No. 09/552,201 filed Apr. 19, 2000 for COMPUTER WITH MODULAR COMPONENTS of Elizabeth B. Diaz, Felix Guerra and Yancy Chen and U.S. Patent Application filed May 26, 2000 for COMPUTER WITH REMOVABLE PANELS of Eliza eth B. Diaz, Kun-Chi Hsieh, and Bo SiuFai U.S. Application Ser. No. 09/580393, filed May 26, 2000 both of which are hereby incorporated by reference for all that is disclosed therein.

As illustrated in FIGS. 1–4, the integrated front and top member 52 and left side panel member 58 are positioned in abutting contact along a seam line 62. A door opening 70 is defined in the casing. The opening is defined by a casing annular, axially extending wall portion 72 including a first portion 74 defined by member 52 and a second portion 76 defined by left side panel member 58. The opening has an arcuate top portion 78 and an arcuate bottom portion 80 with an intermediate portion 82 having parallel vertical sides extending there between. The casing has a generally flat front wall portion 84, which includes the periphery 86 of opening 70.

Figure 5:
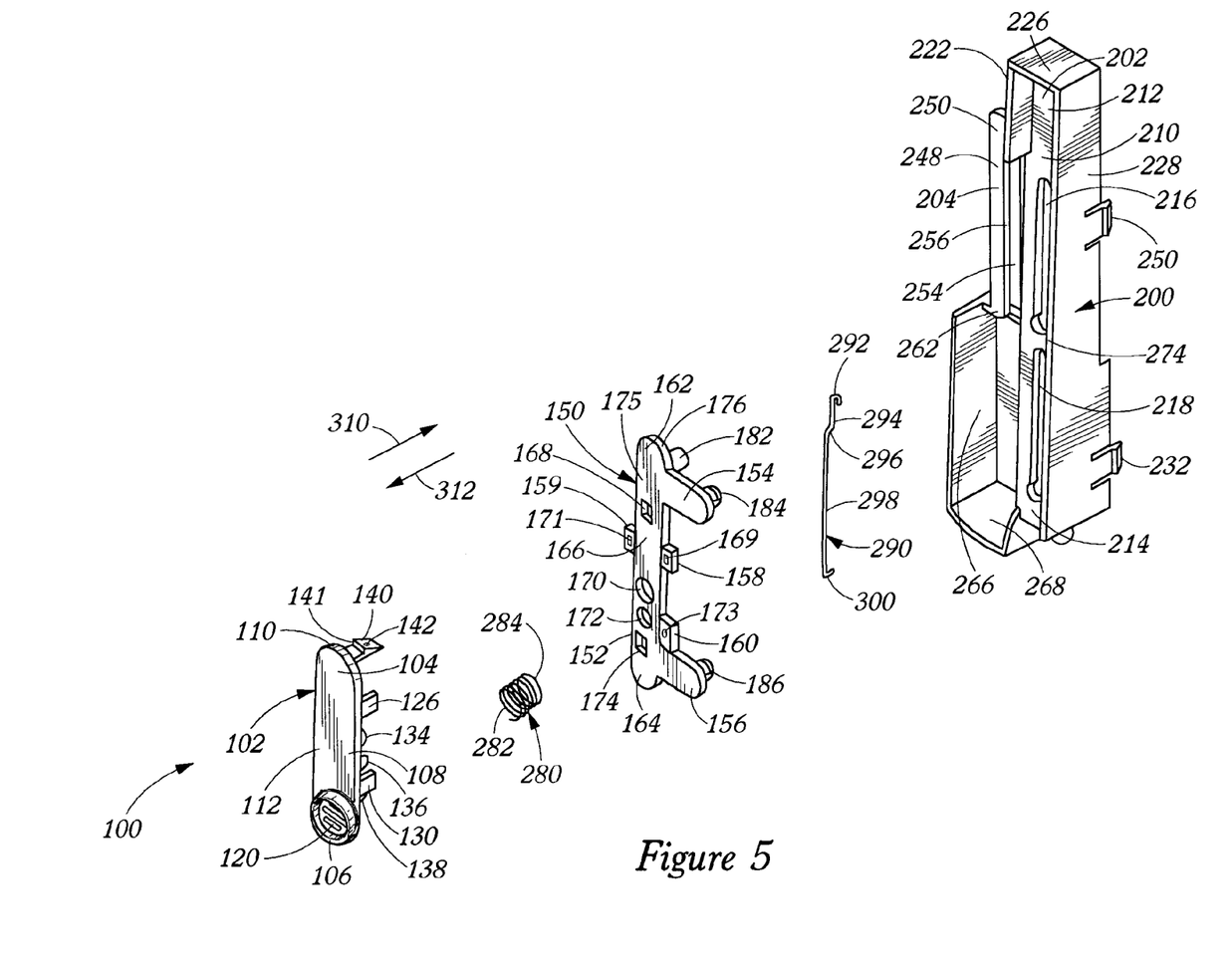
FIG. 5 is an exploded perspective view of a computer door assembly.
Figure 6:
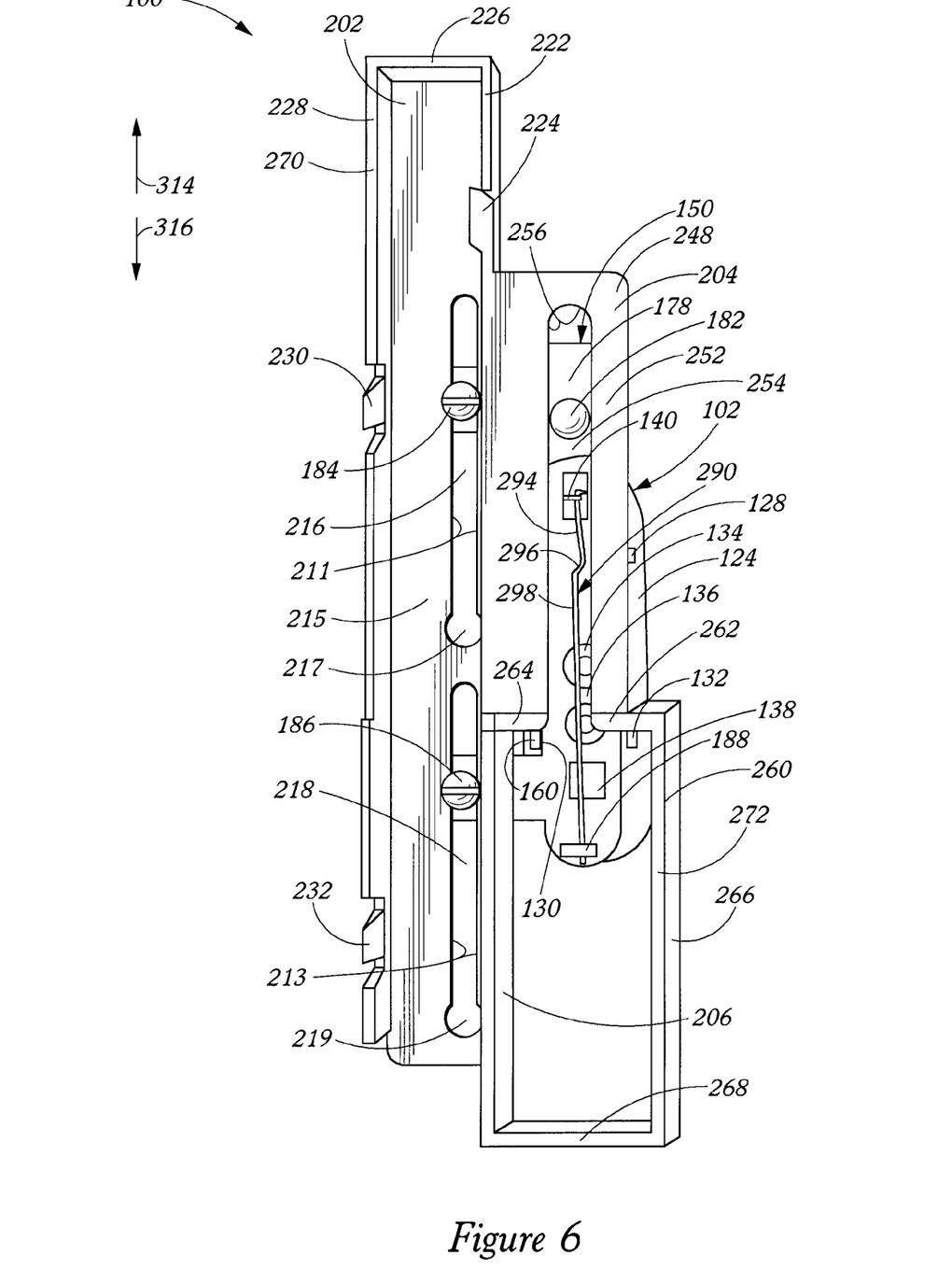
FIG. 6 is a rear elevation view of the door assembly of FIG. 5.
Figure 7:
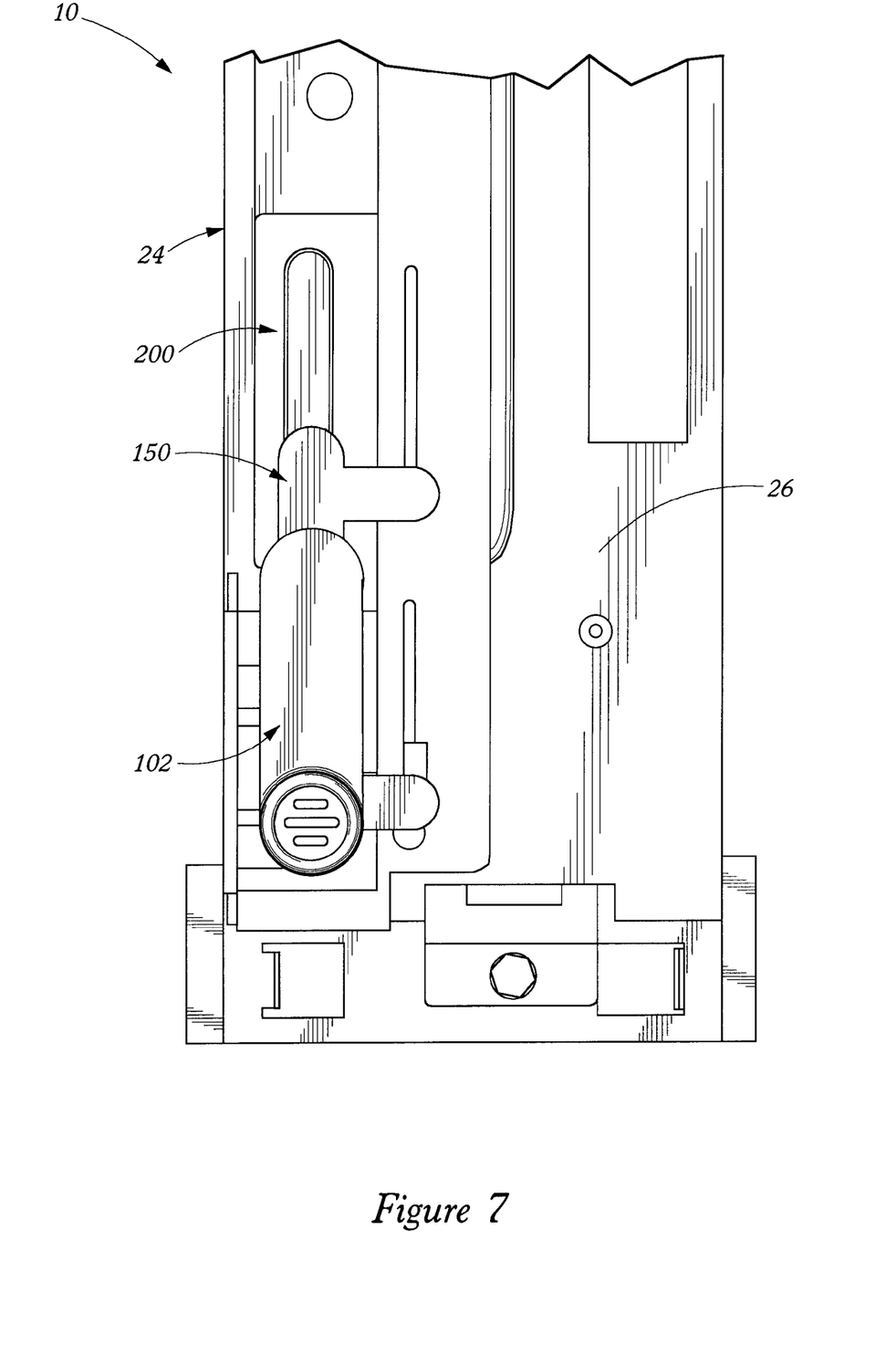
FIG. 7 is a front elevation view of a lower portion of a computer with all of the exterior casing removed and with a door assembly mounted on a computer housing and positioned in a closed operating state.

A door assembly 100 is mounted on the sheet metal housing front face 26. The various components of the door assembly 100 is best illustrated in FIGS. 5 and 6 which shown an exploded front perspective view and an assembled rear elevation view of the door assembly.

Door Member

The door assembly includes a door member 102, which conforms to the shape of opening 70 and is adapted to be closely received there within. The door member has an arcuate top portion 104, an arcuate bottom portion 106 and an intermediate portion 108 extending there between. The door may have nearly identical dimensions to that of opening 70 except slightly smaller to enable the door to move into and out of the opening. For example, the door may have a width of about 18 mm and the opening may have a width of about 18.5 mm and the door may have a length of about 61 mm and the opening may have a length of about 61.5 mm. The door has an annular axially extending wall 110 which may have a dimension the same as or substantially the same as the dimension of the opening wall 72 which may be, e.g., 3 mm. The door has a generally flat front face surface 112, which extends parallel to the surface of the casing front wall in the area of the periphery 86 of opening 70. When the door is in the closed positioned illustrated in FIG. 1. A lower truncated pipe shaped projection may be provided at a bottom front portion of the door. The truncated pipe portion 114 has an upper wall portion which may extend out, e.g., 5 mm, and a lower wall portion 118 which may extend out, e.g., 1 mm, the truncated pipe shaped projection has a circular inner portion 120 having a plurality of recessed surface portions 122 thereon adapted to facilitate engagement of the door with a person's finger. The door has a flat rear surface 124 with upper spaced apart tabs 126, 128 and lower spaced apart tabs 130, 132. Cylindrical projection members 138, 136 also extend from the rear surface of the door. A bottom projection member 138 also projects from the rear surface of the door member. The bottom projection member 138 has a vertically extending slot therein adapted to locate a leaf spring as described in further detail below. A top projection member 140 having a hole 142 therein for holding a leaf spring also projects from the rear surface 124 of door member 102.

Slider Member

The door assembly 100 also includes a π shaped slider member 150. The slider member has a generally vertically extending portion 152 with laterally extending leg portions 154, 156 projecting from an upper and lower portion thereof. The slider member 150 also includes laterally extending tab receiving portions 158, 159, 160 having openings therein for receiving door member guide tabs as described in further detail below. The slider member 150 has a rounded top portion 162, a rounded bottom portion 164, and an intermediate portion 166 extending there between. The intermediate portion has a top cutout 168, a first round cutout 170, a second round cutout 172 and a bottom cutout 174 extending between a generally flat front surface 175, and a generally flat rear surface 178 thereof. The slider member has an axially extending annular side wall 176 extending between the front and rear surfaces thereof. The slider member has an upper cylindrical rear projection 182 mounted on the vertically extending portion 152 and a pair of rear projections 194, 186 having expandable end portions, which project rearwardly from leg portion 154, 156. Slider member 150 also has a rearwardly projecting, slotted spring keeper projection 188 extending from a bottom rear surface thereof as best shown in FIG. 6.

Guide Bracket

With continued reference to FIGS. 5 and 6 the door assembly 100 also includes a guide bracket 200 having a first elongated portion 202 and a second elongated portion 204 sharing a common vertically extending lateral wall 206. The first portion 202 has a front face 210 with a top portion 212 and a bottom portion 214 and an opposed rear face 215.

Vertically extending slots 216, 218 extend between the front and rear faces and are adapted to receive slider projections 184, 186 there through. The first portion has a left side wall 222, which projects forwardly and rearwardly, and a rearwardly projecting tab 224 provided at a lower left side thereof. The first elongated portion 202 also has a top wall 226 and a right side wall 228. Each projecting forwardly and rearwardly. Notched tabs 230, 232 project outwardly from the right side wall.

The second elongated portion 204 has an upper portion 248 with opposed flat front and rear surfaces 250, 252. Upper portion 248 has an elongate open ended slot 254 extending there through having parallel slot side walls 256 which act as guide surfaces for projection 182 of the slider member which is adapted to be slidingly received there between. The second elongate portion 204 has a lower portion 260 comprising laterally extending walls 262, 264 which project rearwardly only and left and bottom walls 266, 268 which project forwardly and rearwardly. Rear edge surfaces 270, 272 of the first and second elongate portions 202, 204 are adapted to be positioned abutting engagement with the front face 26 of sheet metal housing 224.

Biasing Devices

As best illustrated in FIG. 5 door assembly 100 also includes a biasing assembly which may include coil spring 280 and leaf spring 290. Coil spring 280 is adapted to be received about cylindrical projection member 134 of door 102 with a first end 282 thereof positioned in abutting engagement with a rear surface 124 of door 102 and with a second end 284 thereof positioned in abutting engagement with the front surface 175 of slider member 150.

The leaf spring 290 comprises a top hooked end 292, a short upper portion 294, e.g., 10 mm long, a relieve bend 296, a longer lower portion 298, e.g., 40 mm and a bottom foot portion 300. The leaf spring 290 is adapted to have the top hook portion 292 thereof received through hole 142 in door member top rear projection 140 and is adapted to have the lower portion 298 thereof at a location just above foot 300 to be received and held by slider member rear slotted keeper projection 188.

Figure 2:
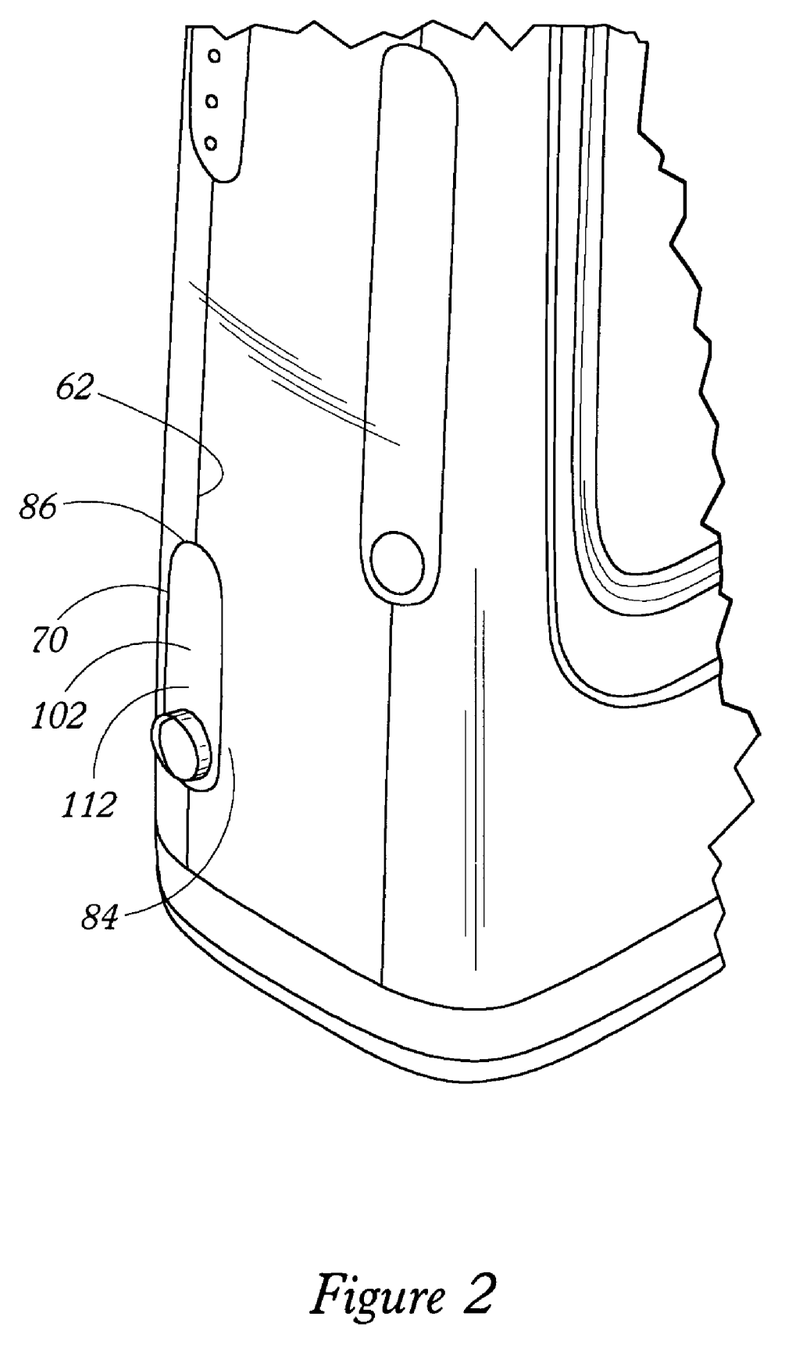
FIG. 2 is a perspective view of the computer of FIG. 1 with the door in an axially inwardly positioned state.
Figure 9:
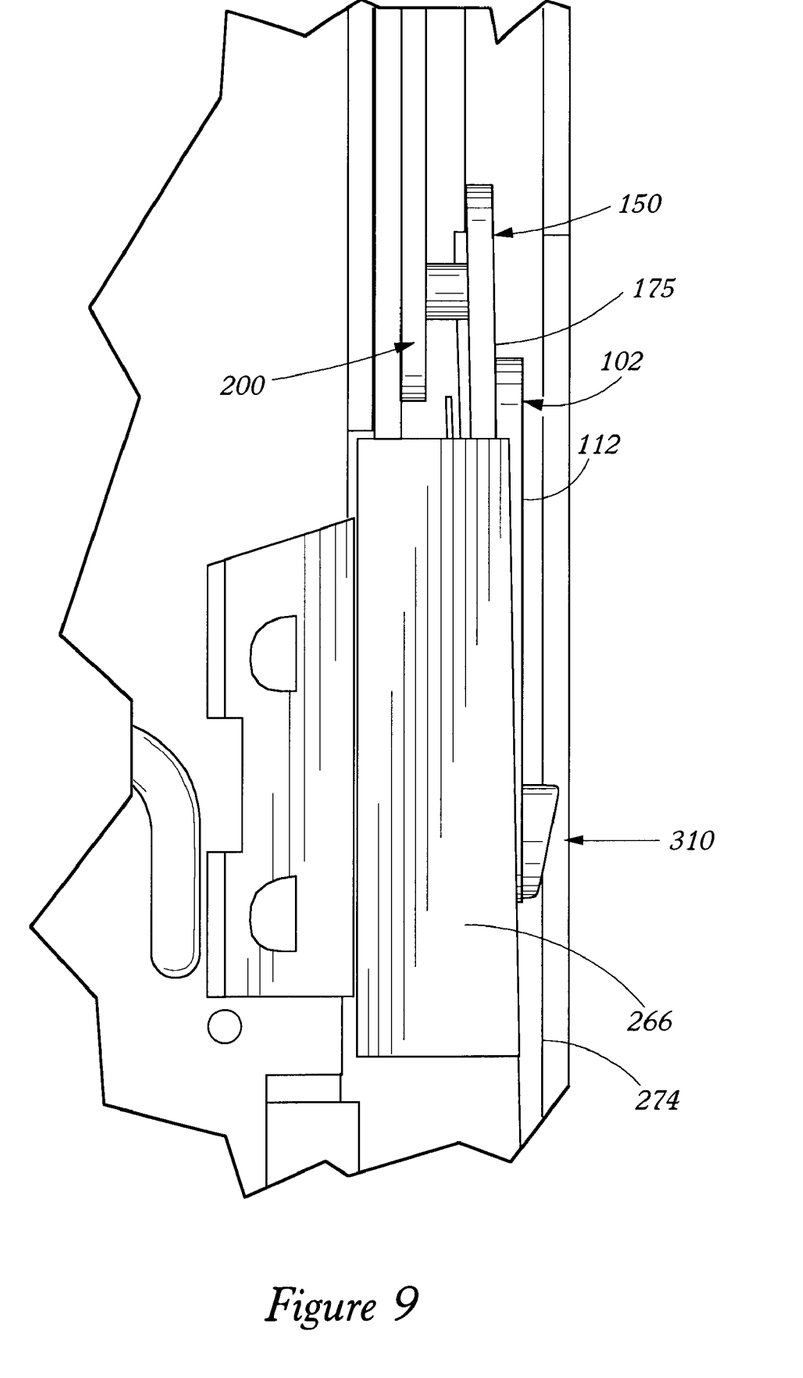
FIG. 9 is a left side elevation view of a lower portion of a computer with all of the casing removed and with a door positioned in an axially inwardly positioned operating state also shown in FIG. 2.

The door assembly 100 is assembled by placing leaf spring 280 around door rear projection 134. Next the door is aligned with π-shaped slider member 150 and urged in a rearward direction 310 relative thereto so that projection member 140 passes through opening 168; cylindrical projection 134 with spring 280 thereabout passes through opening 170 capturing spring 280 between door 112 and slider 150; cylindrical projection 136 is received through hole 172; bottom projection member 138 is received through hole 152; and tab portions 126, 128, 130 are received through openings 169, 171, 173 in tab receiving projections 158, 159, 160 of the slider. Each of the receiving holes is adapted to prevent vertical and lateral displacement of the door 102 with respect to the slider 150 while allowing plunging, axial movement in rearward direction 310 and forward direction 312. After the spring mounted member 112 has been positioned with its rearward projections extending through slider member 150, leaf spring 290 is attached by hooking the top hook portion 292 through hole 142 and door member projection 140 and by sliding the bottom end of lower portion 298 through a laterally extending slot not shown in projection member 188. The door member 102 is thus secured to slider member 150 with a step portion 141 on member 140 abuttingly engaging a rear surface of the slider member adjacent an upper edge of hole 168 to prevent movement of the top portion of the door in direction 312 passed the point of abutting engagement and with a similar operation being preformed by an abutment surface (not shown) of lower door projection 138 against a rear surface of slider 150 adjacent hole 174. The spring member 280 biases door member 102 axially outwardly, i.e., in forward direction 312 so that surface 141, etc. of projections 142 and 138 are normally in abutting engagement with the rear surface of slider 150. Members 126, 130, 134, and 136 act to prevent lateral and vertical displacement of the door member 112 with respect to the slider member 150. When a person pushes against surface 120 in axial direction 310 with her/his finger it causes the lower portion of door 102 to initially move in direction 310 causing an end portion of projection 138 to engage lower portion 298 of spring member 290. This engagement causes member 290 to be placed under tension and urged into an arquate shape which causes a rearward (310) force to be applied to the upper end of the door at projection 140 by end 292. This force causes the upper end of the door 102 to be urged against the slider such that application of force solely at surface 120 may be caused to urge door 102 into parallel abutting contact with slider member 150 as illustrated in FIGS. 2 and 9.

After assembling door 112, slider 150 and springs 280 and 290 this subassembly is mounted on guide bracket 200.

The door/slider/spring assembly is mounted on guide bracket 200 by positioning slider rear projections 184, 186 through the enlarged end portions 217, 219 of vertically extending slots 216, 218 and then spreading the split end portions of projections 184, 186 to prevent their removal from the slots 216, 218. The spacing between projections 184, 186 and guide projection 182 is such that rearwardly extending guide projections 182 is received in slot 254 when projections 184, 186 are positioned in slots 216, 218. The side wall portions 256 of slot 254 serve to guide member 182 to restrain movement to vertical up and down directions 314, 316 while the side walls 211, 213 of slots 216, 218 perform the same function with respect to projections 184, 186. Slot 254 is also sufficiently wide to enable spring member 290 and projection 140 to project freely threrethrough when the door member 102 is urged against slider 150. Projection 182 may also be provided with an abutment surface (not shown) which rides against front surface 210 of the bracket to prevent axial displacement of the slider 150 toward the bracket. Similarly, the back surface of the slider leg portions 154, 156 abutting slidingly engage the forward surface of front face 210 to prevent displacement of the slider in direction 310 and a lateral projection of the end portions 184, 186 right against bracket rear surface 215 to prevent forward 312 displacement of the slider relative to the bracket.

With the door 102, slider 150 springs 280, 290 and guide bracket 200 thus assembled the door assembly 100 is mounted on the housing front face 26 by insertion of tabs 224, 230, 232 through corresponding cutouts (not shown) in the housing front face. The door assembly 100 is positioned such that the door 102 in its full down position completely covers the ports 32, 34, 36, 38 of the electrical connection port assembly 30 and in its full up position shown in FIG. 11 completely exposes these ports 32, 34, 36, 38.

Operation

The door 102/slider 150 assembly is displaceable within the bracket between a full down position with projection 184, 186, 182 at the bottom of their respective slots and a full up position with the projections 182, 184, 186 at the top of their respective slots.

Figure 1:
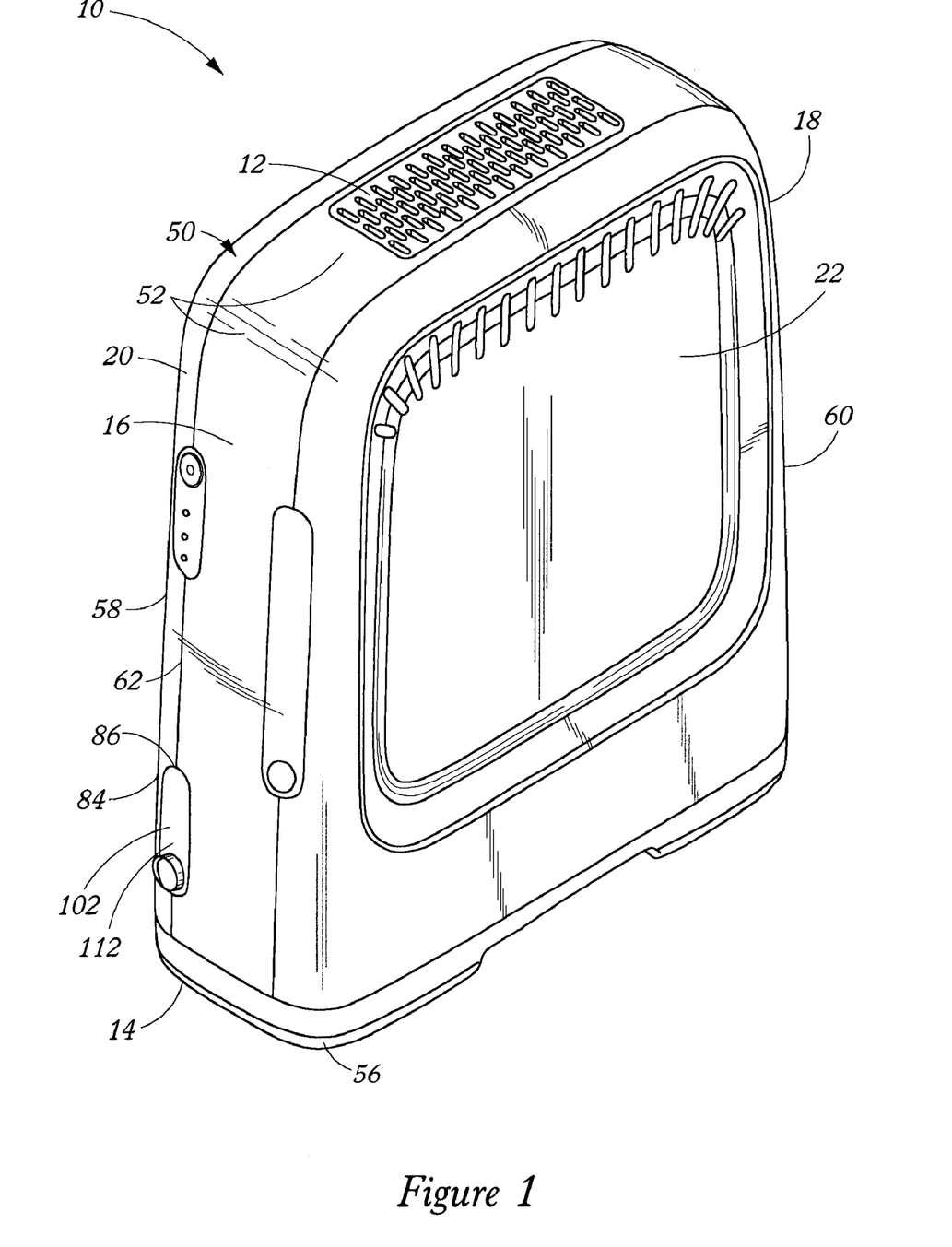
FIG. 1 is a perspective view of a computer having an electrical connector access door in a closed state.
Figure 8:
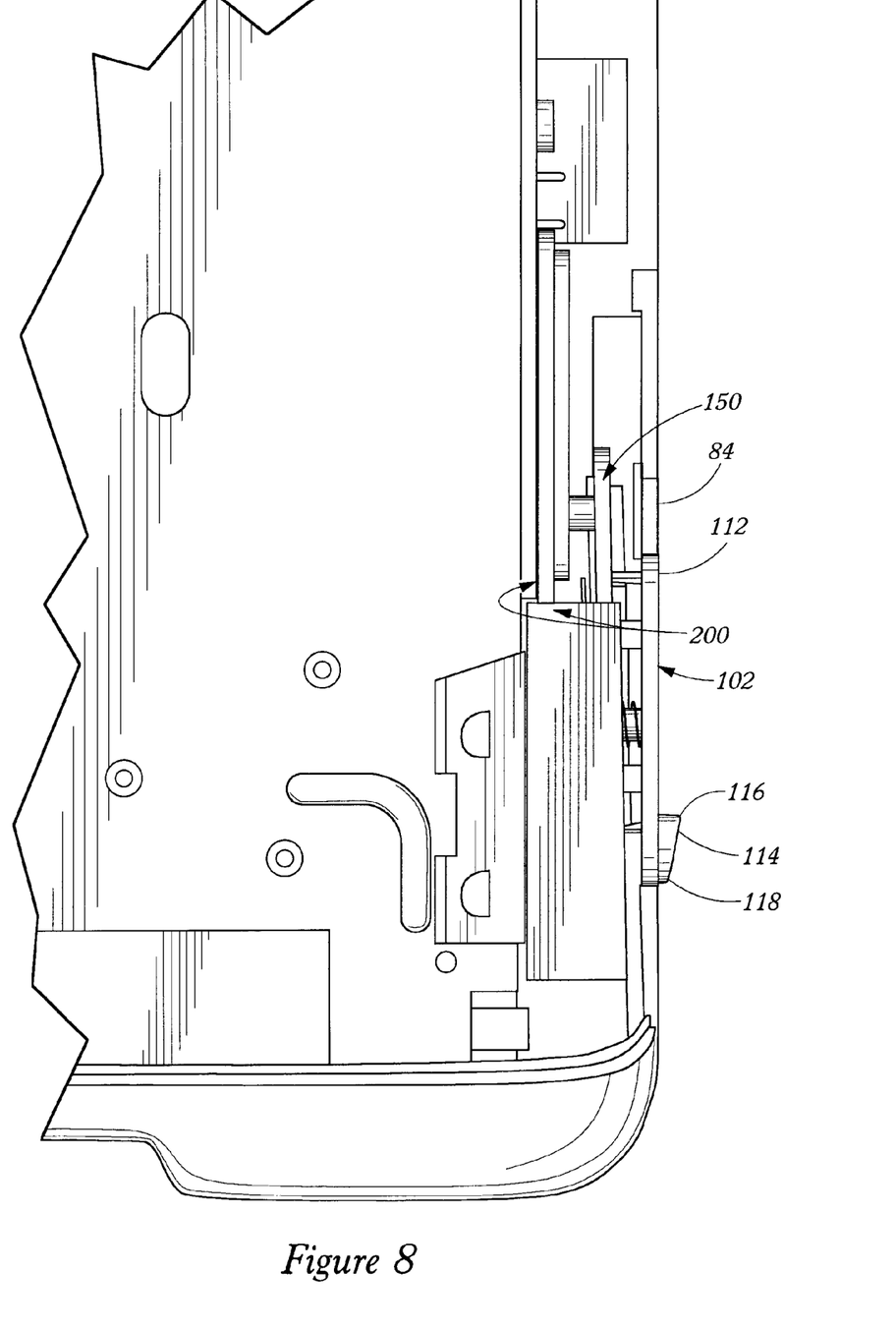
FIG. 8 is a left side elevation view of a lower portion of a computer with a side panel of the casing removed and with a door in a closed operating state.

The length of the members 140, 138 between abutment surface 140, etc. thereof and the back surface of door 102 is such that the door in its normal outwardly biased position has the front surface 112 thereof positioned in continuous parallel relationship with the periphery 86 of casing opening 70, i.e., the door and the casing are flush, FIGS. 1 and 8.

As illustrated by FIGS. 2 and 9 application of rearward 310 axial force causes door 112 to be moved into abutting contact with the front surface 175 of the slider member 150 with the top surface 112 of the door member positioned slightly rearward of the forward edge 274 of slide wall 266, the surface against which the casing wall abuts. The axial force applied by a person's finger urges lower door portion 120 forwardly and also causes projection 138 to engage a lower portion 298 of spring member 290 placing it in tension and causing it to assume an arcuate or bow shape which causes end 292 to apply an axial rearward force to door top rear projection member 140. Thus, what would ordinarily be an off center axial force which would cause only displacement of the lower end of door 102, is through co-action of spring member 290 with projection 140 caused to produce axial forces to be applied at both ends of door 102 causing the door assembly to move into abutment with the slider 150 at both the top and bottom portions thereof.

Figure 3:
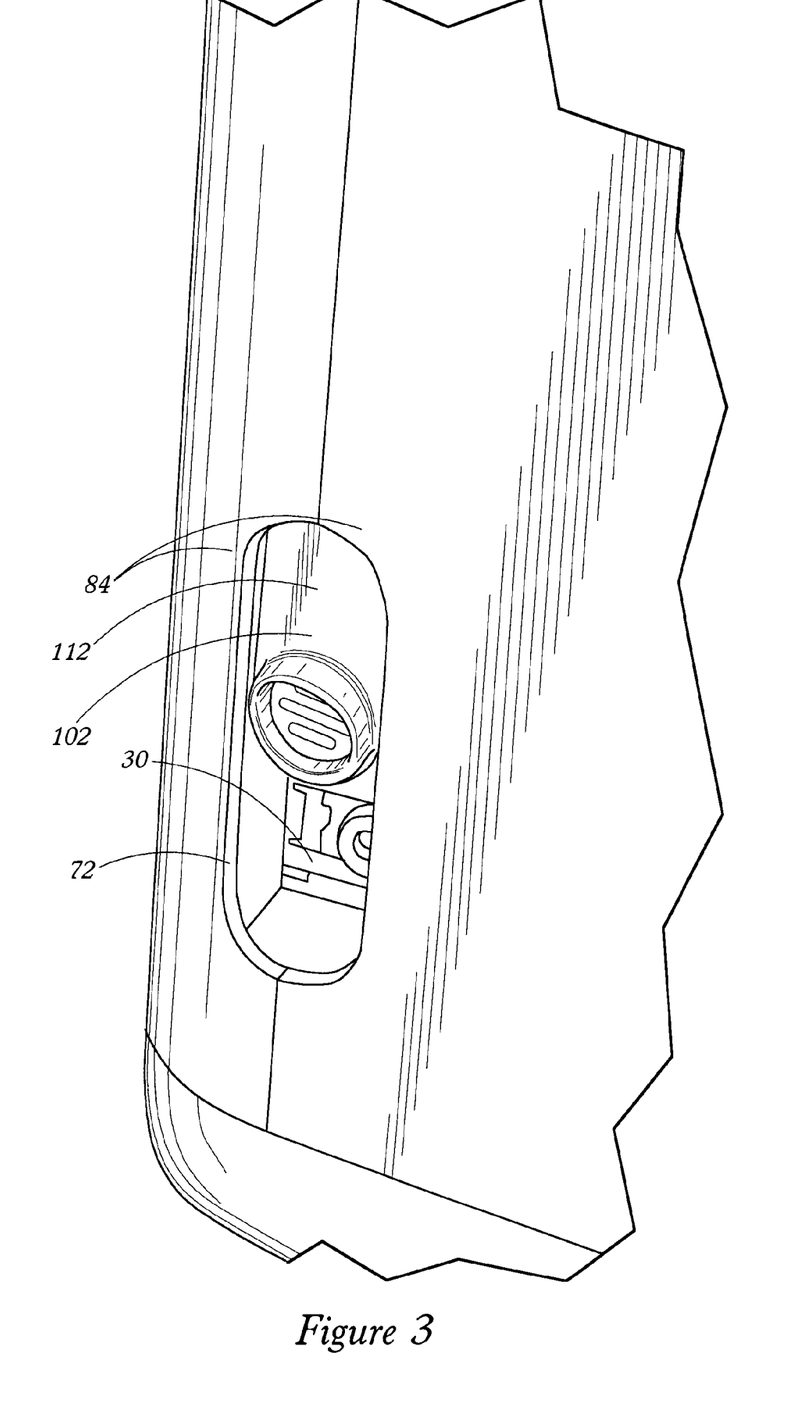
FIG. 3 is a perspective view of the computer of FIG. 1 with the door in an axially inwardly positioned partially vertically raised state.
Figure 4:
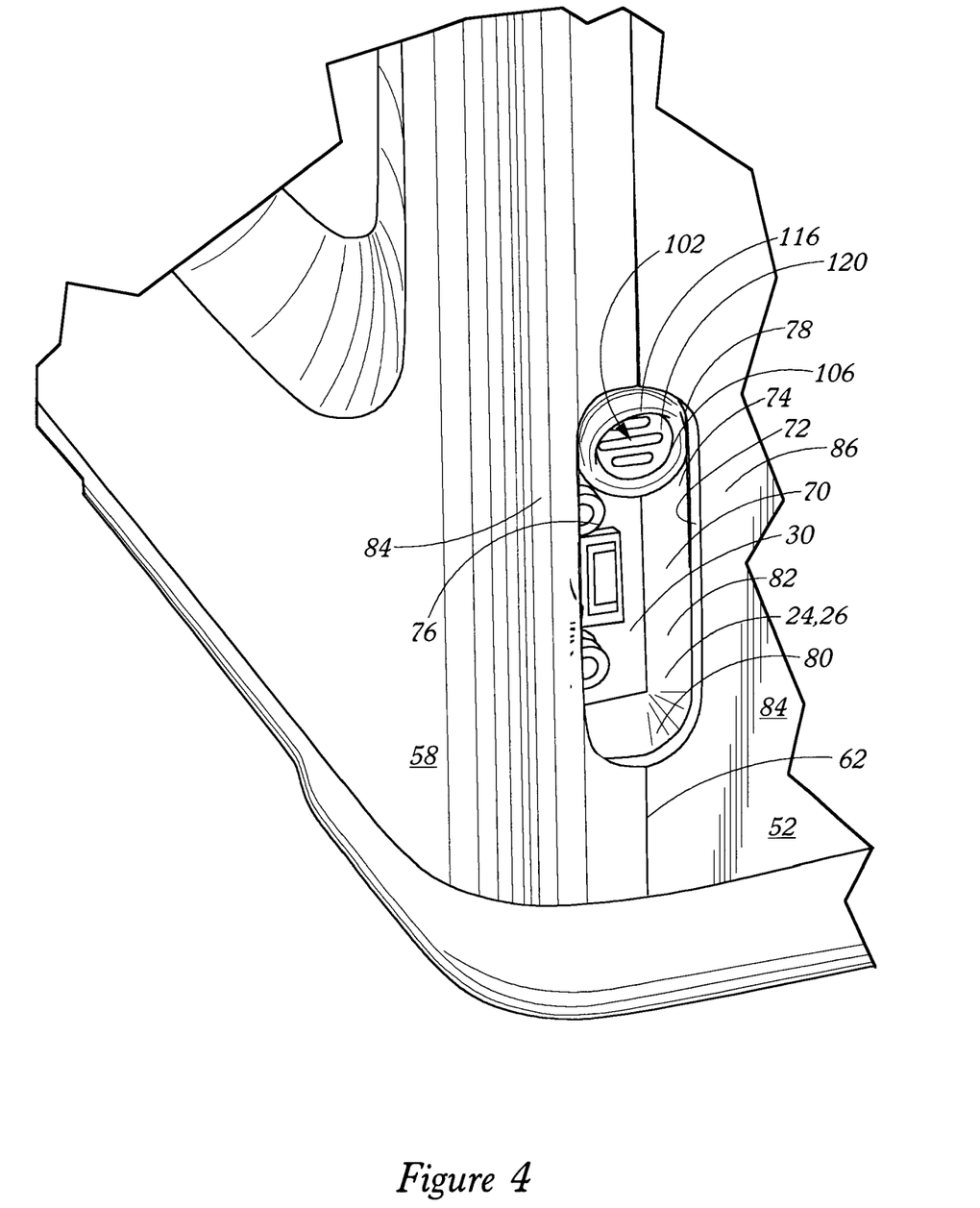
FIG. 4 is a perspective view of the computer of FIG. 1 with the door in an axially inwardly positioned fully raised state.
Figure 10:
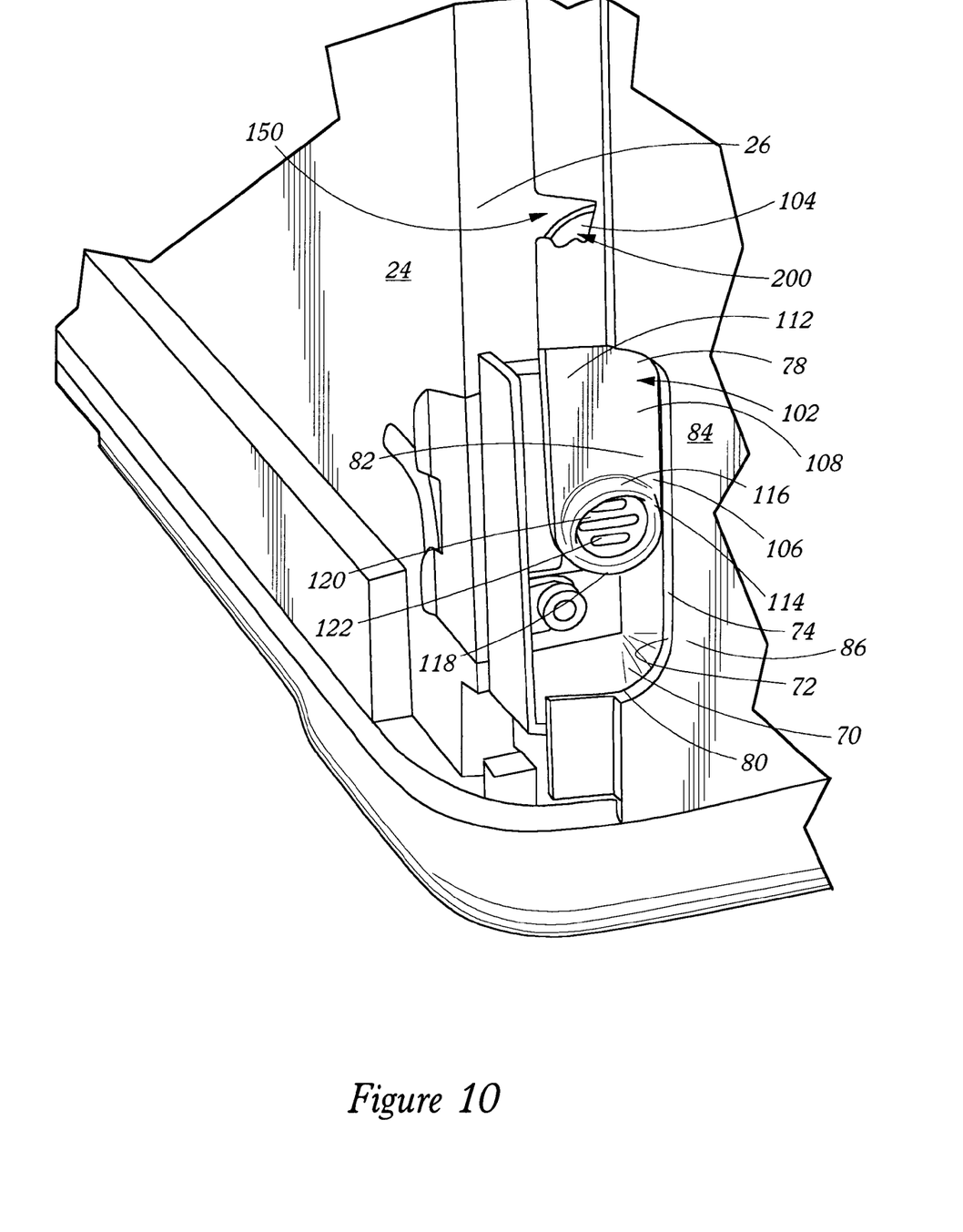
FIG. 10 is a perspective view of a lower front portion of a computer with a side panel of the casing removed showing a door in an axially inwardly positioned partially raised operating state also shown in FIG. 3.
Figure 12:
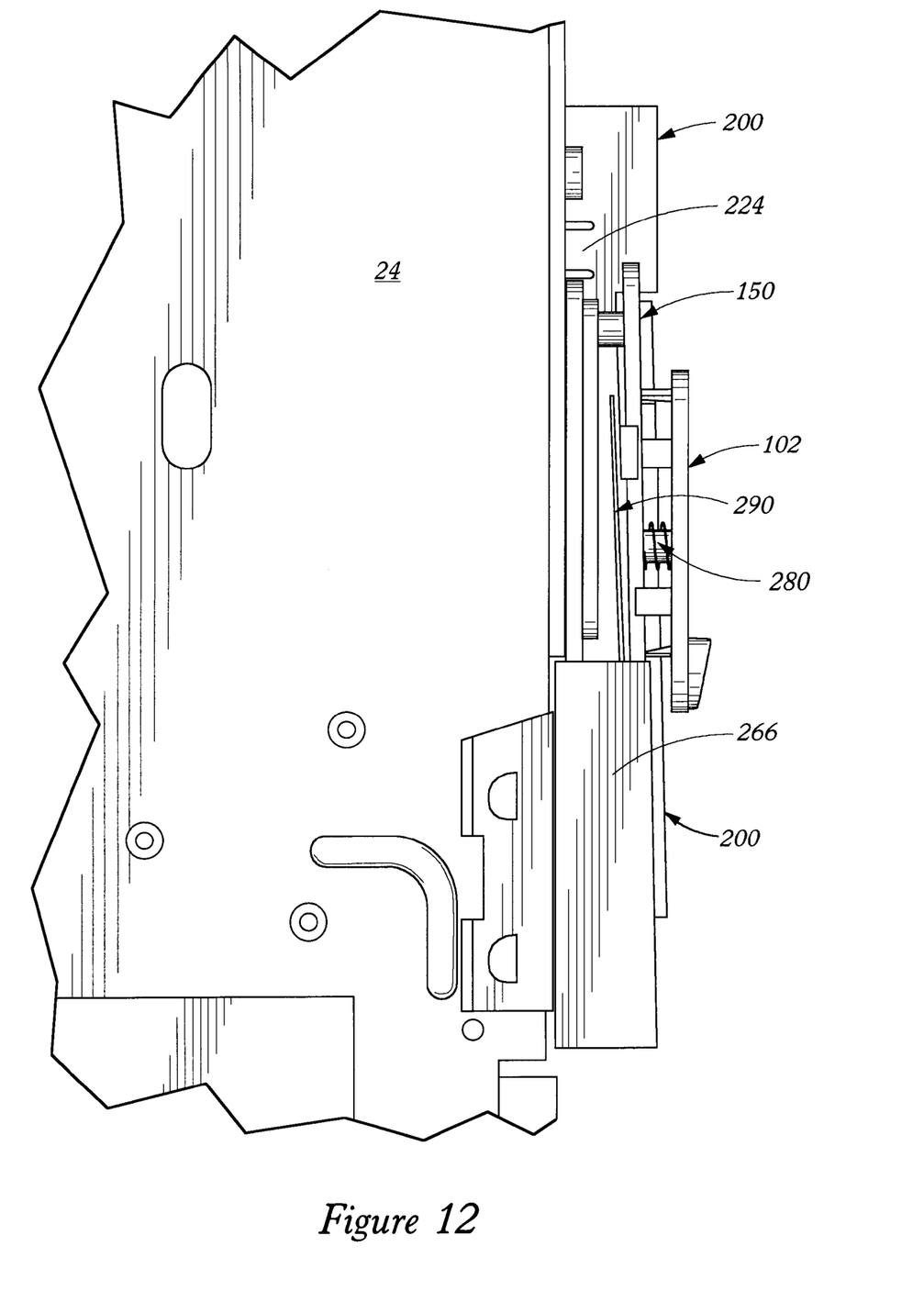
FIG. 12 is a left side elevation view of a lower front portion of a computer with a casing removed with a door in the raised position illustrated in FIG. 11.

In this position forward surface 112 is positioned slightly rearward 310 of the casing and thus is now ready to be moved in a vertical direction behind the casing by pushing vertically against the truncated pipe portion 114 with the operator's finger. This next position is best illustrated in FIG. 3 and 10. In this position the casing wall rear surface itself abuts against the forward surface 112 of door member 102 preventing it from moving forwardly. Door 102 may be further vertically moved to the full up position illustrated in FIG. 4 by further vertical pushing on projection 114. This full up vertical position is illustrated also in FIGS. 11 and 12 except that the casing has been removed in these figures and therefore the door member 102 is projected axially outwardly beyond the position it would occupy if the casing were in place.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A computer comprising:

at least one electrical connection port;

an exterior casing overlying said port and having a casing opening in axial alignment with said port;

a door member displaceable mounted on said computer, said door member having a plurality of translationally displaced operating positions comprising a first operating position with said door member positioned in said opening with an exterior surface thereof flush with a circumscribing surface of said exterior casing; a second operating position with said door member axially aligned with and inwardly displaced from said opening and a third operating position with said door member axially offset from said opening.

2. The computer of claim 1, said door member being outwardly axially biased and being hand displaceable between operating positions.

3. The computer of claim 1, said door member being connected to a force transmitting member which transmits axial force applied to one end of said door member to an opposite end of said door member.

4. A computer door assembly comprising:

a door member having a front surface and a rear surface and a plurality of rearwardly extending door projections;

a slider member having a front surface and a rear surface; a plurality of openings extending between said front and rear surfaces; a plurality of rearwardly extending slider projections; said plurality of rearwardly extending door projections extending through corresponding ones of said plurality of openings in said slider member;

a coil spring mounted about one of said plurality of door projections and captured between said rear surface of said door member and said front surface of said slider member;

a leaf spring having a first end attached to a first one of said rearwardly extending door projections and having a second end attached to one of said plurality of [said] rearwardly extending slider projections and an intermediate portion resiliently deflectablely engagable by a second one of said rearwardly extending door projections during rearward displacement of said door member relative said slider member;

a guide member having a plurality of guide surfaces thereon adapted to guidingly engage at least one of said plurality of rearwardly extending slider projections;

said door member being axially displaceable relative said slider member between a first axial position and a second axial position;

said slider member being displaceable relative said guide member in a plane extending transversely of said axial direction.

5. The computer door assembly of claim 4 said door member having a peripheral shape and a wall thickness, and further comprising a casing fixedly positioned relative said guide member and having a generally flat front surface and a back surface and having an opening therein with the same peripheral shape and wall thickness as said door member.

6. The computer door assembly of claim 4, said door member being selectively displaceable from a first position in axial alignment with said casing opening with said front surface of said door member flush with said front surface of said casing and a second position with said door positioned in axially offset relationship with said casing opening and with said front surface of said door positioned in abutting contact with said rear surface of said casing.

7. A method of opening a computer door comprising:

(a) pushing the door axially against an abutment surface;

(b) sliding the door in a direction perpendicular to the axial displacement.

8. A method of accessing an interior portion of a computer comprising:

(a) moving a computer door in a first direction into engagement with an abutment surface;

(b) sliding the computer door in a second direction perpendicular to the first direction.

9. The method of claim 8 wherein moving the computer door in a first direction comprises moving the door past a second abutment surface extending in the first direction.

* * * * *